(12) United States Patent
Takagi et al.

(10) Patent No.: US 8,018,498 B2
(45) Date of Patent: Sep. 13, 2011

(54) IMAGE PICKUP APPARATUS AND EXPOSURE CONTROL METHOD

(75) Inventors: Masaaki Takagi, Saitama (JP); Kentaro Tokiwa, Saitama (JP); Hiroshi Endo, Saitama (JP); Masaki Kohama, Saitama (JP); Shigeo Toji, Saitama (JP); Koji Kobayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 905 days.

(21) Appl. No.: 11/941,749

(22) Filed: Nov. 16, 2007

(65) Prior Publication Data

US 2008/0309792 A1   Dec. 18, 2008

(30) Foreign Application Priority Data

Nov. 17, 2006  (JP) .................................. 2006-311610

(51) Int. Cl.
*H04N 5/228*  (2006.01)
*H04N 9/73*  (2006.01)
*H04N 5/222*  (2006.01)

(52) U.S. Cl. .................... 348/222.1; 348/224.1; 348/371

(58) Field of Classification Search .............. 348/220.1, 348/221.1, 222.1, 229.1, 224.1, 227.1, 345, 348/356, 362–366, 370
See application file for complete search history.

(56) References Cited

U.S. PATENT DOCUMENTS

| | | | | |
|---|---|---|---|---|
| 5,682,201 A * | 10/1997 | Ogawa | ........................ | 348/224.1 |
| 6,356,714 B1 * | 3/2002 | Ishiguro | ........................ | 396/166 |
| 6,603,508 B1 * | 8/2003 | Hata | ........................ | 348/229.1 |
| 6,882,363 B1 * | 4/2005 | Oda et al. | ........................ | 348/226.1 |
| 7,145,602 B2 | 12/2006 | Shiga | | |
| 2003/0179311 A1 * | 9/2003 | Shiga | ........................ | 348/370 |
| 2004/0046872 A1 * | 3/2004 | Udagawa | ........................ | 348/221.1 |
| 2004/0189822 A1 * | 9/2004 | Shimada | ........................ | 348/229.1 |
| 2005/0052553 A1 * | 3/2005 | Kido et al. | ........................ | 348/296 |
| 2005/0168620 A1 * | 8/2005 | Shiraishi | ........................ | 348/345 |
| 2005/0219381 A1 * | 10/2005 | Takeuchi et al. | ........................ | 348/229.1 |

FOREIGN PATENT DOCUMENTS

| | | |
|---|---|---|
| JP | 09-258097 A | 10/1997 |
| JP | 2000-115630 A | 4/2000 |
| JP | 2001-222039 A | 8/2001 |
| JP | 2003-114374 A | 4/2003 |
| JP | 2003-189183 A | 7/2003 |
| JP | 2004-157517 A | 6/2004 |

OTHER PUBLICATIONS

Notification of Reasons for Refusal, dated Mar. 23, 2011, issued in corresponding JP Application No. 2006-311610, 5 pages in English and Japanese.

* cited by examiner

*Primary Examiner* — Lin Ye
*Assistant Examiner* — Euel K Cowan
(74) *Attorney, Agent, or Firm* — Sughrue Mion, PLLC (57) ABSTRACT

A digital still camera includes a lens system and an image sensor. The image sensor receives object light through the lens system to output an image signal of an object, wherein exposure control and autofocus control of the lens system are carried out according to the image signal. The image sensor photographs an image of the object after the exposure control and the autofocus control. Auxiliary light is applied to the object with an illumination light source for the autofocus control. A second exposure value is determined by use of a first exposure value determined according to object brightness measured while the illumination light source is inactive. Exposure is carried out to measure object brightness by use of the second exposure value while the auxiliary light is applied, for determining a third exposure value for use in the autofocus control with the auxiliary light.

20 Claims, 9 Drawing Sheets

IMAGE PICKUP APPARATUS AND EXPOSURE CONTROL METHOD

BACKGROUND OF THE INVENTION

1. Field of the Invention

The present invention relates to an image pickup apparatus and exposure control method. More particularly, the present invention relates to an image pickup apparatus and exposure control method in which an exposure value can be determined precisely even in a short time in a structure with AE control and AF control.

2. Description Related to the Prior Art

A digital still camera is an image pickup apparatus widely used, and includes an image sensor of a CMOS type or CCD type. An object image is photographed by an image sensor, is converted into digital image data, which is recorded in an internal memory, memory card or other recording medium. A type of digital still camera is widely used in which auto exposure (AE) control and autofocus (AF) control are carried out by referring to an image signal obtained by the image sensor.

In the AE control, object brightness is detected from the image signal obtained by photographing of an object image by an image sensor. An exposure value, namely a combination of a shutter speed and an aperture stop value, is determined to optimize the exposure according to the detected object brightness. In the AF control, a contrast detecting method is widely used. When a contrast of an object, namely an integrated value of a high frequency component of an image signal obtained by exposure of an object image, becomes the highest, the position is obtained as an in-focus position. The objective lens system is moved and set in the in-focus position.

For the AF control, the contrast is evaluated while an in-focus position of a lens system is moved serially, to detect a position where the contrast is maximized locally. However, only insufficient contrast is obtained from an object image with a low brightness level, for example, in an indoor place with little illumination. There is a digital still camera in which AF auxiliary light is applied to an object from a light source, to raise the object brightness.

In the AF control, an exposure value according to the brightness level which is detected shortly before is used in a fixed manner. If the brightness level changes with AF auxiliary light, the exposure value becomes improper, to lower the precision in detecting the in-focus position. To solve such a problem, U.S. Pat. No. 7,145,602 (corresponding to JP-A 2003-008985) discloses an exposure control in which exposure amounts are obtained before and after application of AF auxiliary light. If an increase in the exposure amount after using the AF auxiliary light is equal to or higher than a predetermined amount, the exposure amount before using the AF auxiliary light is used. If the increase in the exposure amount after using the AF auxiliary light is lower than the predetermined amount, the exposure amount after using the AF auxiliary light is used. JP-A 2003-114374 discloses a digital camera in which a difference in the object brightness is obtained between a state before illumination of AF auxiliary light and a state during illumination with a highest light amount. An optimized light amount of AF auxiliary light is determined.

A dynamic range of an image sensor is small owing to its characteristic. A range of the object brightness measurable at one time is small with the image sensor for light reception. To measure the object brightness with precision, photometry is effected for a plurality of times at different exposure values in combination of the shutter speed and aperture stop value. However, it is likely that a great delay occurs until detection of an in-focus position if the photometry of a plurality of times is effected before the AF control. In particular, if the measurement is directly before the AF control for exposure of a still image in response to a shutter release button, there arises a problem in which time lag of the shutter release is too great in a period from the depression of the shutter release button to forming of a still image by exposure.

SUMMARY OF THE INVENTION

In view of the foregoing problems, an object of the present invention is to provide an image pickup apparatus and exposure control method in which an exposure value can be determined precisely even in a short time in a structure with AE control and AF control.

In order to achieve the above and other objects and advantages of this invention, an image pickup apparatus is provided, having an image sensor for picking up an object through a lens system to output an image signal. An illumination light source applies auxiliary light to the object. There is an autofocus evaluator for autofocus control of setting the lens system in an in-focus position according to the image signal while the auxiliary light is applied. A brightness detector carries out first brightness detection of first object brightness according to an image signal from the image sensor without the auxiliary light, and for carrying out second brightness detection of second object brightness according to the image signal while the auxiliary light is applied. An exposure determiner determines a first exposure value from the first object brightness, determining a second exposure value from the first exposure value, and determining a third exposure value from the second object brightness. An exposure controller for controls exposure of the image sensor in the first and second brightness detection, the autofocus control and still image pickup, wherein the exposure, in the second brightness detection, is controlled according to the second exposure value, and in the autofocus control, is controlled according to the third exposure value.

The first brightness detection is carried out when or before a release button is depressed halfway, and the second brightness detection and the autofocus control are carried out after the first brightness, and the still image pickup is carried out when the release button is depressed deeply.

The exposure controller controls exposure of the image sensor according to the first exposure value for the still image pickup.

The brightness detector splits the image sensor into plural regions, and detects the first and second object brightness from the regions, and the first object brightness is detected in plural times of measuring in each of which the exposure controller changes an exposure value in a stepwise manner, so as to measure the regions in plural brightness levels.

If the first object brightness is equal to or more than a reference brightness level, the brightness detector is inactive and without the second brightness detection. The illumination light source is inactive without emitting the auxiliary light for the autofocus control after the first brightness detection, and the exposure controller controls exposure of the image sensor according to the first exposure value.

The second exposure value is determined by shifting the first exposure value positively by a predetermined shift amount.

The shift amount is predetermined according to a light amount of the auxiliary light.

The shift amount is so determined that brightness of the object of a predetermined shortest object distance is within a measurable range by use of the auxiliary light.

The image sensor operates with an electronic shutter function for controlling time of storing charge according to a shutter speed. The exposure controller includes an aperture stop mechanism for adjusting an amount of light incident upon the image sensor, and adjusts an aperture stop value and the shutter speed according to an exposure value.

The exposure controller determines a first aperture stop value and a first shutter speed according to the first exposure value, and sets a second shutter speed shifted by the shift amount toward a high speed side according to the second exposure value.

The exposure controller sets the first aperture stop value and the second shutter speed for the second brightness detection, and sets the first aperture stop value and a third shutter speed for the autofocus control, and the third shutter speed is a shutter speed to obtain the third exposure value in a condition of the first aperture stop value.

The exposure controller sets the first aperture stop value and the first shutter speed for the still image pickup.

Furthermore, a frame rate setter sets a frame rate of the image sensor, and determines the frame rate highest in a range where the image sensor is operable with the third shutter speed.

If the second shutter speed is equal to or higher than a predetermined shutter speed, the brightness detector is inactive and without the second brightness detection. The illumination light source is inactive without emitting the auxiliary light for the autofocus control after the first brightness detection, and the exposure controller sets the first shutter speed and the first aperture stop value.

When the second shutter speed is faster than the predetermined shutter speed, the exposure controller changes the aperture stop value to set a shutter speed upon the second brightness detection is set within the predetermined shutter speed.

Furthermore, a mode selector sets a selected one of a normal photographing mode for photography at a normal object distance and a macro photographing mode for photography of an object in enlargement at an object distance shorter than the normal object distance. The exposure determiner, if the normal photographing mode is set, determines the second exposure value by shifting the first exposure value positively by a shift amount predetermined according to a light amount of the auxiliary light, and if the macro photographing mode is set, determines the second exposure value by shifting the first exposure value positively by a larger shift amount than the predetermined shift amount.

Also, an exposure control method is provided, and includes carrying out first brightness detection of first object brightness according to an image signal from an image sensor without auxiliary light. A first exposure value is determined from the first object brightness. A second exposure value is determined from the first exposure value. Second brightness detection of second object brightness is carried out according to an image signal output by the image sensor while the auxiliary light is emitted to illuminate, wherein in the second brightness detection, exposure of the image sensor is controlled according to the second exposure value. A third exposure value is determined from the second object brightness. Autofocus control of setting a lens system in an in-focus position is carried out according to the image signal while the auxiliary light is emitted to illuminate, wherein in the autofocus control, exposure of the image sensor is controlled according to the third exposure value.

Furthermore, a still image is picked up with the image sensor after the autofocus control, wherein exposure of the image sensor is controlled in still image pickup according to the first exposure value.

Consequently, an exposure value can be determined precisely even in a short time in a structure with AE control and AF control.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
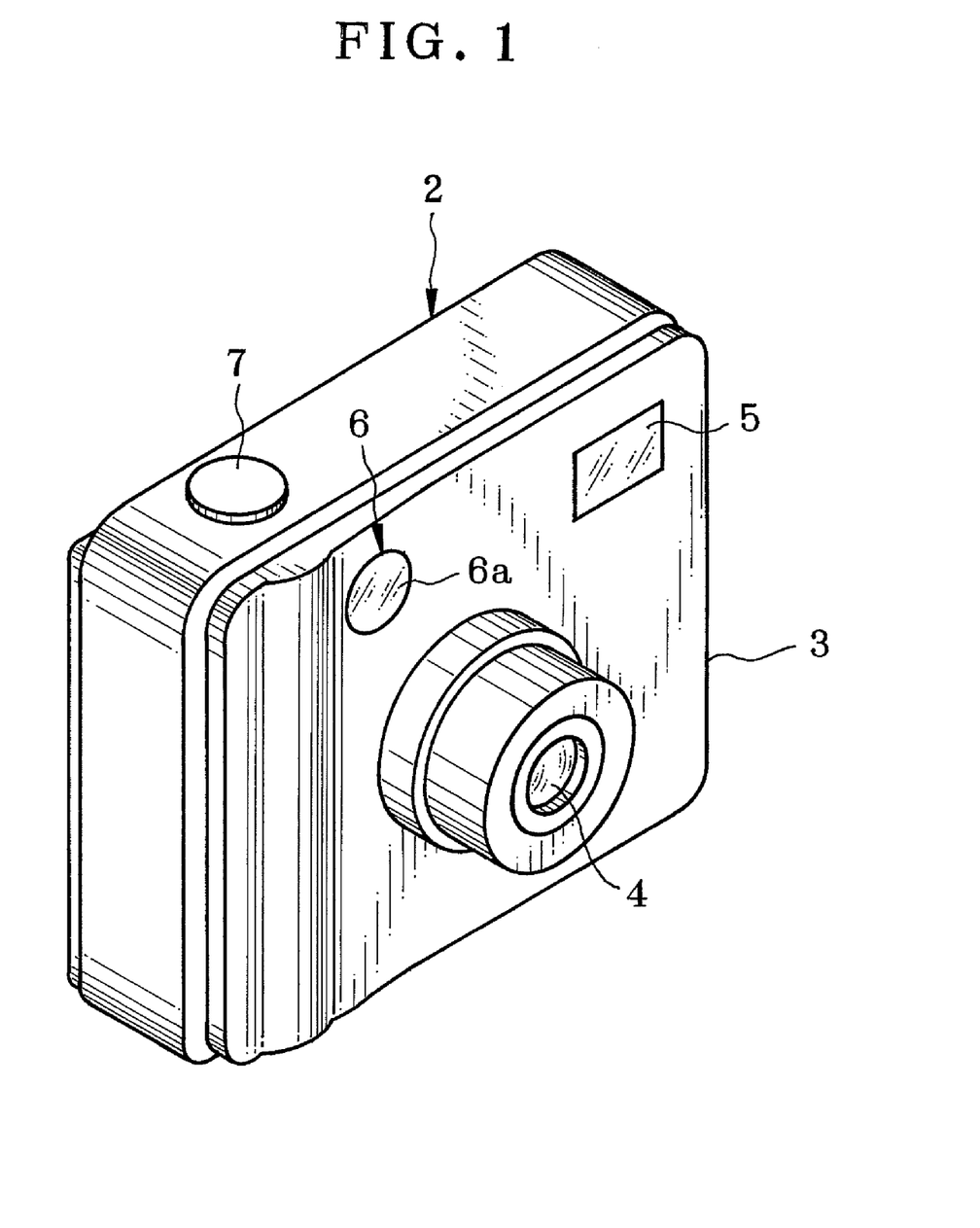
FIG. 1 is a perspective view illustrating a digital still camera.

In FIG. 1, a digital still camera 2 is illustrated. The digital still camera 2 has a camera body 3. A front of the camera body 3 has an objective lens system 4, a flash light source 5, and an illumination window 6a. An auxiliary illumination light source 6 emits auxiliary light through the illumination window 6a. A shutter release button 7 is disposed on an upper face of the digital still camera 2. An LCD display panel 8 of FIG. 2 and various input buttons are disposed on the rear of the digital still camera 2.

Figure 2:
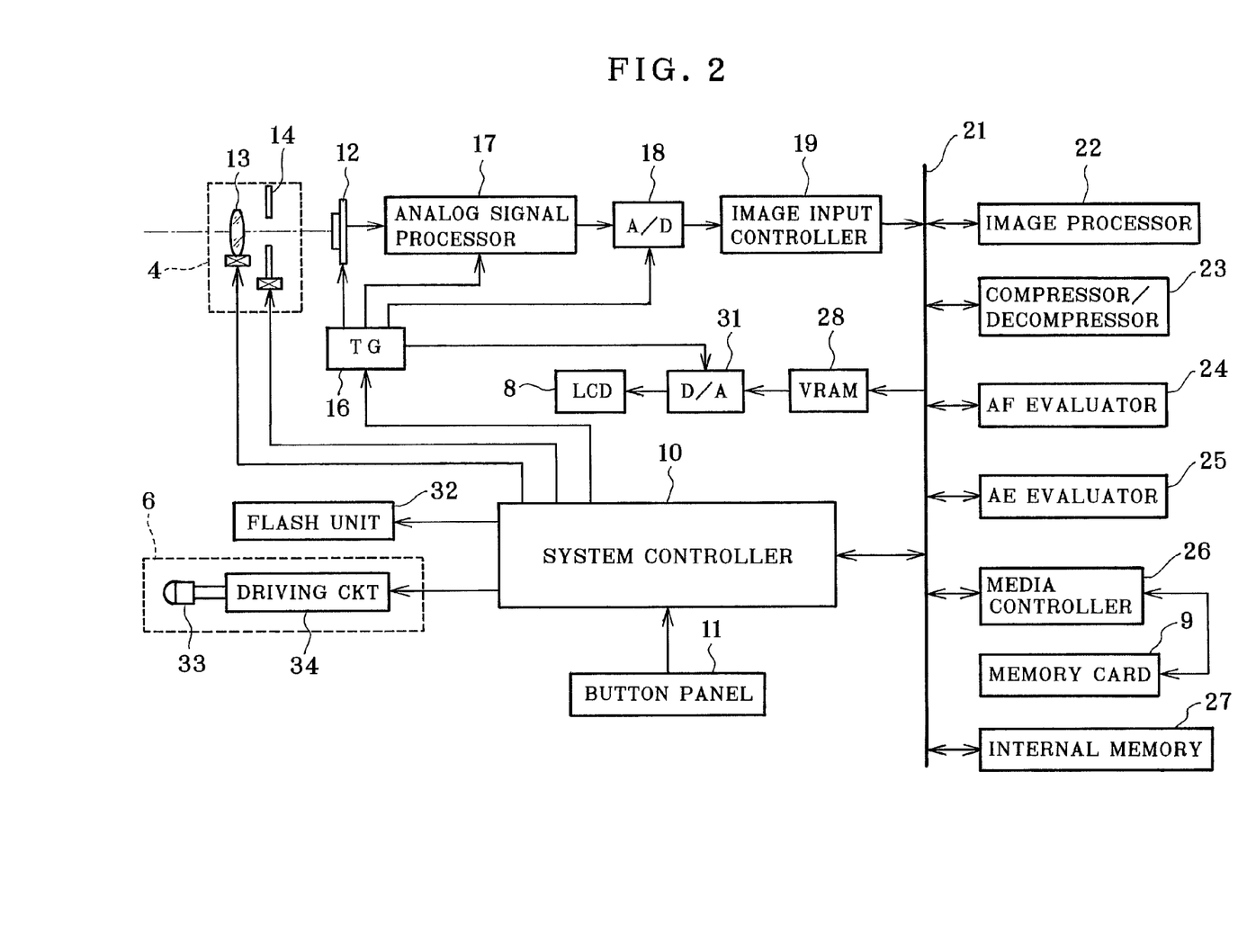
FIG. 2 is a block diagram schematically illustrating a digital still camera.

The shutter release button 7 is a two step switch, and is depressed halfway for turning on a first switch, and depressed fully for turning on a second switch of shutter release. If the shutter release button 7 is not depressed in the photographing mode, a live image is displayed on the LCD display panel 8 for an object in a photographing region. When the shutter release button 7 is depressed halfway, object brightness is measured for auto exposure control for taking a still image, by determining a shutter speed and aperture stop value according to the object brightness. Also, autofocus control is effected to evaluate an in-focus position of the lens system 4 for the object so as to move and set the lens system 4 in the in-focus position. If the use of AF auxiliary light through the illumination window 6a is designated for the AF control, the auxiliary light assisted AE control for the AF is carried out after the still image AE control and before the AF control.

After the standby operation, a still image is picked up. The shutter release button 7 is fully depressed. A shutter speed and aperture stop value are set according to the still image AE control. The lens system 4 is focused according to the AF control. Thus, an image is photographed. A still image is obtained and converted into image data. A memory card 9 of FIG. 2 is loaded removably, and accessed for storing the image data.

Note that a sequence of the still image AE control, the auxiliary light assisted AE control for the AF, and the AF control can be changed over by the structure other than the above in the shutter release button 7. For example, the shutter release button 7 may be depressed fully even at one time for the changeover of the control. Also, the shutter release button 7 can be constructed for depression of only one step.

If the object brightness is considerably low, the illumination light source 6 operates in synchronism with the image pickup of a still image and applies flash light to an object. For the AF control, if the object brightness is equal to or lower than a reference brightness level, the illumination light source 6 emits AF auxiliary light toward the object for ensuring a sufficient light amount for autofocus.

Note that a structure other than the illumination light source 6 may be used as illuminator, which may be initially for a different purpose. For example, a flash light source can be used also as illuminator at the time of the autofocus operation. Also, an additional light source can be incorporated in the digital still camera 2, for facilitating framing of a user in a dark place by emission of light, and can be used also for the autofocus operation as auxiliary light source.

In FIG. 3, the digital still camera 2 is illustrated. A button panel or input interface 11 as mode selector includes various operation buttons, keys and the like in addition to the shutter release button 7. A system controller 10 controls various elements in the digital still camera 2 in response to signals from the button panel 11.

An image sensor 12 is disposed behind the lens system 4. Object light passed through the lens system 4 becomes incident on the image sensor 12. A focusing mechanism 13 and an aperture stop mechanism 14 are associated with the lens system 4. The focusing mechanism 13 adjusts the focus of the lens system 4. The aperture stop mechanism 14 adjusts an amount of light incident on the image sensor 12. The focusing mechanism 13 includes a motor, motor driver and the like, and moves a focus lens/lens group within the lens system 4 for focusing. The aperture stop mechanism 14 includes an aperture on an optical axis of the lens system 4, aperture stop blades for closing the aperture, and an actuator for driving those. The system controller 10 controls the focusing mechanism 13 and the aperture stop mechanism 14.

The image sensor 12 is a CCD (charge coupled device), and includes a great number of photo receptor elements on a receiving surface. A timing generator (TG) 16 generates drive signals for driving the image sensor 12. The photo receptor elements of the image sensor 12 convert object light into charge, and store the charge, so as to output an image signal of an analog form. Thus, an object image is converted electrically into the signal. Note that the image sensor 12 may be a type other than the CCD, for example CMOS image sensor.

The image sensor 12 has a function of an electronic shutter function, which is responsive to an electronic shutter pulse input by the timing generator 16, to adjust the time of storing the charge by discharging and deleting the stored charge. It is possible to adjust the shutter speed or exposure time by adjusting the period of inputting a shutter pulse in each of frame periods. In the embodiment, the exposure amount is adjusted by setting the shutter speed of the electronic shutter of the image sensor 12 and the aperture stop value of the aperture stop mechanism 14.

Various parameters for the timing generator 16 are determined by the system controller 10 for operation of a number of items in a predetermined sequence. The timing generator 16 generates a drive signal for the image sensor 12, a sync signal for synchronism of various elements, and the like. It is possible according to the parameters to change a shutter speed of an electronic shutter of the image sensor 12, and change a frame rate with which the image sensor 12 repeatedly stores charge and reads the charge. Note that an example of the timing generator 16 in the embodiment is one in which determined parameters are effective in a succeeding frame period which is next to the frame period of the determination of the parameters.

An analog signal processor 17 is supplied with an image signal from the image sensor 12. The analog signal processor 17 includes a CDS circuit, amplifier and the like, operates in synchronism with the reading of charge from the image sensor 12, and processes the image signal for correlation double sampling and amplification. An A/D converter 18 converts the image signal from the analog signal processor 17 into image data.

An image input controller 19 is supplied with image data from the A/D converter 18. The image input controller 19 controls operation inputting the image data to a bus 21. Various circuit elements are connected with the bus 21, including the system controller 10, an image processor 22, a compressor/decompressor 23, an AF evaluator 24, an AE evaluator 25 as brightness detector, a media controller 26, an internal memory 27 and a VRAM 28. The system controller 10 controls those by means of the bus 21. Also, data can be transmitted and received between those circuit elements through the bus 21.

The image processor 22 processes image data by processing of color interpolation, gamma correction, white balance correction, Y/C separation and other operation. The compressor/decompressor 23 compresses the image data before writing to the memory card 9 according to a predetermined compression format such as JPEG format. Also, the compressor/decompressor 23 decompresses the image data read from the memory card 9.

The AF evaluator 24 operates with the system controller 10 and the focusing mechanism 13 for focus adjustment of the lens system 4. The AF evaluator 24 is supplied with image data by the image input controller 19, extracts high frequency components from target detection regions predetermined in a frame of photographing, and integrates the high frequency components to obtain a focus evaluation value, which is sent to the system controller 10. The system controller 10 acquires an in-focus position by maximizing the focus evaluation value, namely maximizing the contrast of the object image. The system controller 10 drives the focusing mechanism 13 to set the lens system 4 in the in-focus position, to focus the lens system 4 on to the object.

The AE evaluator 25 detects object brightness of an object by evaluating the image signal from the image sensor 12. The object brightness is detected in a multi step manner for brightness ranges according to the image data from the image input controller 19, and is sent by the AE evaluator 25 to the system controller 10 which is an exposure controller. The system controller 10 determines a shutter speed of the image sensor 12 and an aperture stop value of the aperture stop mechanism 14 according to the object brightness.

Note that the detection regions used to generate the focus evaluation value may be unequal with the detection regions used to detect object brightness. However, the detection regions for the auxiliary light assisted AE control for the AF, which will be described later, should be equal to the detection regions used to generate the focus evaluation value.

The media controller 26 controls writing and reading of data with the memory card 9. Image data to be recorded is processed by the image processor 22 for image processing, processed by the compressor/decompressor 23 for compression, and is written to the memory card 9 by the media controller 26. In the playback, image data is read from the memory card 9 by the media controller 26, and decompressed by the image processor 22.

The internal memory 27 is a temporary memory to which image data during processing in the image processor 22 is written. Image data of an image to be displayed is written to the VRAM 28. A D/A converter 31 reads image data from the VRAM 28 periodically at a regular interval, to display the image on the LCD display panel 8 according to the image data. In the photographing mode, reception of object light on the image sensor 12 is repeated as exposure. Image data from the image sensor 12 is processed by image processing and written to the VRAM 28 one after another, so a live image is displayed on the LCD display panel 8 by the exposure. In the playback mode, image data read from the memory card 9 and decompressed is written to the VRAM 28, to display the recorded image.

A flash unit 32 includes a flash discharge tube of the flash light source 5, and circuit elements for driving the flash light source 5. The flash unit 32 is controlled by the system controller 10 to emit flash light.

The auxiliary illumination light source 6 includes a light source LED 33 and a driving circuit 34 for driving the light source LED 33. The illumination light source 6 is controlled by the system controller 10. The driving circuit 34, if the object brightness is lower than a reference brightness level, causes the light source LED 33 to illuminate with a regular light amount. Light of the illumination light source 6 is AF auxiliary light applied to an object through the illumination window 6a. An area of illuminating AF auxiliary light from the illumination light source 6 is determined to cover a detection region used to generate a focus evaluation value. The reference brightness level can be determined according to sufficient precision of detecting the contrast of object images, and may be unequal to another brightness level with which use of a flash device is determined for sufficient light amount of photographing.

The still image AE control starts upon halfway depression of the shutter release button 7, and determines an exposure value for photographing a still image in response to full depression of the shutter release button 7, the exposure value being a combination of a shutter speed of an electronic shutter function of the image sensor 12, an aperture stop value of the aperture stop mechanism 14 and the like. The still image AE control is a multi step sequence determined in consideration of smallness in the dynamic range of the image sensor 12. A range of brightness of an expected scene is split into plural measuring ranges of brightness measurable by the image sensor 12. To this end, the system controller 10 controls the image sensor 12 for receiving object light according to a combination of the shutter speed and aperture stop value associated with each one of the measuring ranges.

The auxiliary light assisted AE control for the AF is a task for the purpose of the AF control in a state of illumination with AF auxiliary light, and determines a combination of a shutter speed of an electronic shutter of the image sensor 12 and an aperture stop value of the aperture stop mechanism 14. The auxiliary light assisted AE control for the AF is carried out if the system controller 10 determines that the object brightness obtained by the still image AE control is lower than the reference brightness level.

In the auxiliary light assisted AE control for the AF, the image sensor 12 receives object light while AF auxiliary light is applied to the object, and outputs image data. The AE evaluator 25 as brightness detector detects object brightness according to the image data, for the system controller 10 to determine a shutter speed and aperture stop value. In the auxiliary light assisted AE control for the AF, it is considered that the object brightness will be high considerably owing to the application of the AF auxiliary light in the light reception of the image sensor 12. Thus, the exposure value for use in the auxiliary light assisted AE control for the AF is a value obtained by shifting the exposure value obtained from the still image AE control toward the positive side.

Figure 3:
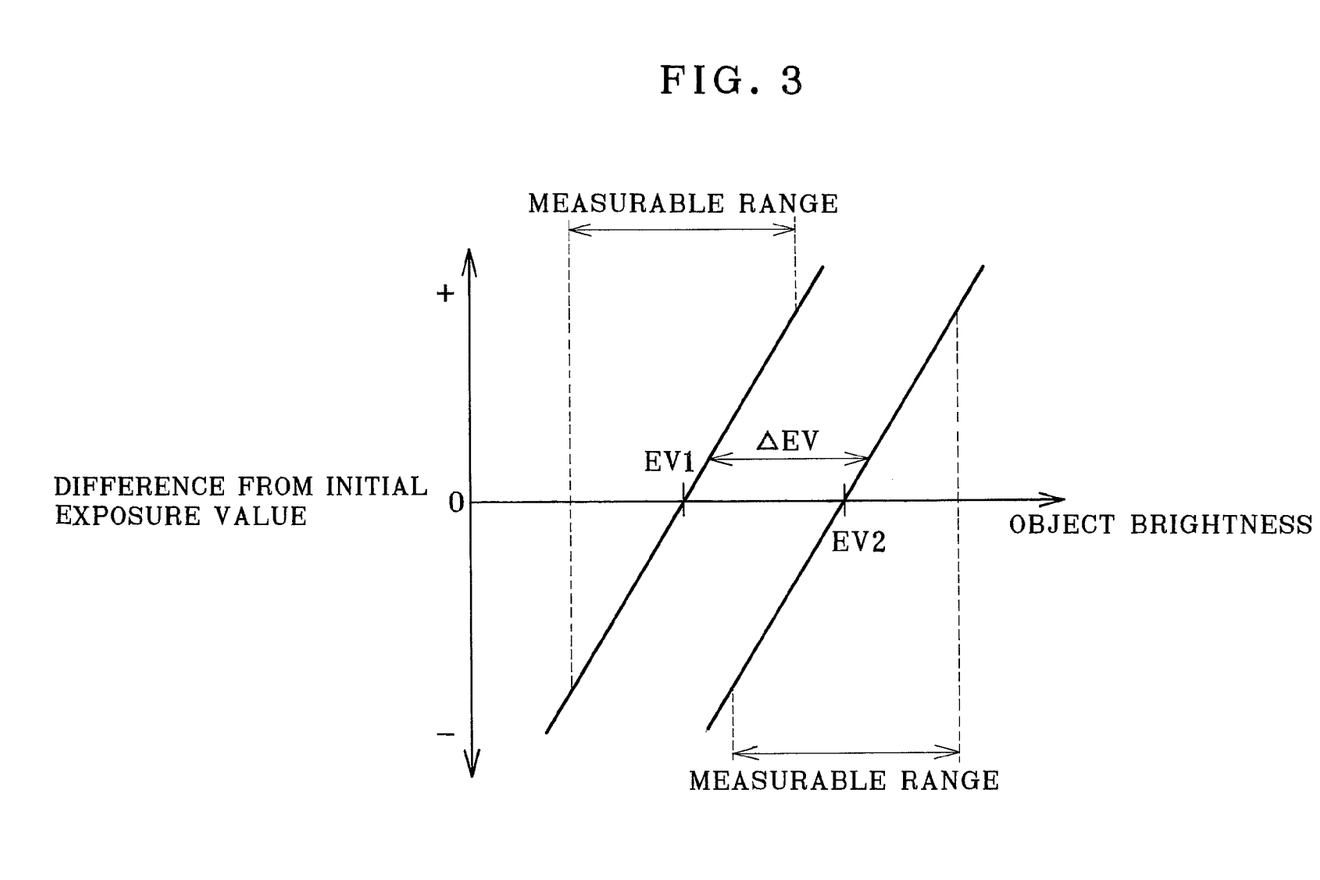
FIG. 3 is a graph illustrating a relationship between an exposure value of still image AE control and that of auxiliary light assisted AE control for the AF.

In FIG. 3, let EV1 be an exposure value obtained by the still image AE control. The object brightness can be measured in a measurable range which contains the exposure value EV1 and is constantly defined by the sensitivity and the like of the image sensor 12. In the auxiliary light assisted AE control for the AF, it is expected that an object brightness will rise with applied AF auxiliary light. Accordingly, object light is received by use of an exposure value EV2 shifted from the exposure value EV1 determined by the still image AE control by an amount $\Delta$EV on the positive side. Thus, a measurable range of the object brightness in the auxiliary light assisted AE control for the AF is shifted by an amount $\Delta$EV on the positive side, to ensure compatibility with application of AF auxiliary light. Even though the object brightness becomes high with AF auxiliary light, it is possible to prevent an overexposed state and prevent failure in the measurement of the object brightness.

The shift amount $\Delta$EV is determined in relation to a light amount of the AF auxiliary light. For example, the exposure value can be shifted toward a positive side by an amount of increase in the brightness in case of applying AF auxiliary light to an object at an object distance which is expected normally and can receive AF auxiliary light in an effective manner. Also, a range of the object distance with possibility of focusing is predetermined according to the lens system or photographing mode. It is possible to determine the shift amount $\Delta$EV to set object brightness within a range of measurable brightness when AF auxiliary light is applied to an object at a shortest object distance within a specific one of the ranges of the object distance. Note that the increase in the object brightness is small according to the greatness in the object distance. The object brightness will slightly increase if the object distance is equal to or more than a great reference distance. It is preferable to determine the shift amount $\Delta$EV to set the object brightness (EV1) obtained by the still image AE control within a range of the measurable brightness in case of the exposure value EV2 in consideration of the dynamic range of the image sensor 12.

In the AF control, the exposure value obtained from the still image AE control is used if no AF auxiliary light is used. The exposure value obtained from the auxiliary light assisted AE control for the AF is used if AF auxiliary light is used. Object light is received on the image sensor 12 in each of in-focus positions. Increase or decrease in the contrast is determined by referring to the focus evaluation value obtained by the AF evaluation. One of positions for the lens system 4 is selectively determined according to the highest contrast. In the embodiment, the focusing is according to the hill climbing method known in the art for detecting an in-focus position.

Also, the focusing may be other methods in which an in-focus position is detected by evaluation of an image signal from the image sensor 12.

To drive the aperture stop mechanism 14, time lag is likely to occur before setting the aperture stop mechanism 14 at an intended aperture stop value. In consideration of this, an equal aperture stop value is used commonly for the auxiliary light assisted AE control for the AF and the AF control, to eliminate the time lag between those. Also, the aperture stop value for use in image pickup of a still image upon fully depressing the shutter release button 7 is used in the AF control. Time lag between the AF control and image pickup of a still image can be eliminated, because no shift of the aperture stop mechanism 14 is required. The aperture stop value in the auxiliary light assisted AE control for the AF is equal to that used in the still image pickup.

Specifically, the aperture stop mechanism 14 is driven and set at the aperture stop value determined by the still image AE control. In the auxiliary light assisted AE control for the AF, the shutter speed is shifted by a shift amount $\Delta EV$ in a direction toward the high speed, to change the shutter speed also for the exposure value determined in the auxiliary light assisted AE control for the AF.

Figure 4:
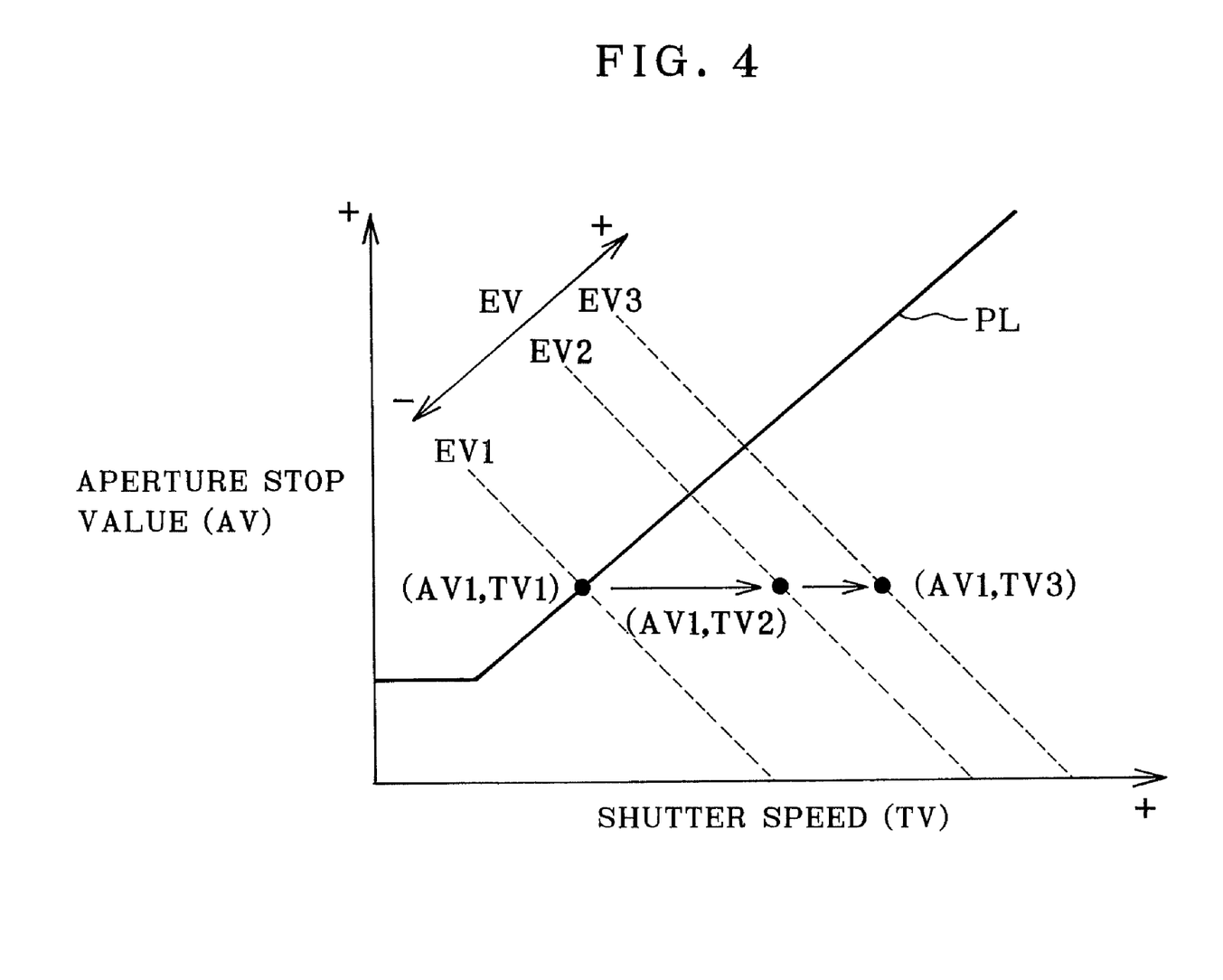
FIG. 4 is a graph illustrating relationships between aperture stop value and shutter speed.

In FIG. 4, an example is illustrated in which a shutter speed TV1 and aperture stop value AV1 are determined according to the exposure value EV1 obtained in the still image AE control by referring to the program line PL. In the auxiliary light assisted AE control for the AF, the exposure value is increased by the shift amount $\Delta EV$. To this end, the shutter speed TV1 is shifted by the shift amount $\Delta EV$ to obtain a shutter speed TV2 ($=TV1+\Delta EV$) on the high speed side while the aperture stop value AV1 is kept fixed. Let EV3 be an exposure value optimized for object brightness measured in the auxiliary light assisted AE control for the AF. For the AF control, a shutter speed TV3 ($=EV3-AV1$) is used to determine the exposure value EV3 on the condition of the aperture stop value AV1.

In the embodiment, a frame rate of the image sensor 12 in the AF control is changed over for a shutter speed determined in any one of the still image AE control and the auxiliary light assisted AE control for the AF, for the purpose of rapidity of the AF control. There are three frame rates for the AF control. The system controller 10 selects one of the three frame rates for driving the image sensor 12 at a determined shutter speed. Parameters are set in the timing generator 16 according to the selected frame rate. This shortens the time required for focusing by shortening the frame periods in the AF control.

In the AF control, the position of elements of the lens system 4 for focusing is changed while an electronic shutter pulse is input to the image sensor 12. Moving of elements of the lens system 4 for focusing and reception of light are carried out in each of frame periods. A frame rate is selectively determined by considering time required for moving elements of the lens system 4. Note that the shutter speed is changed while the aperture stop value is fixed in the embodiment. However, it is possible to change sensitivity of the image sensor 12 in addition to the shutter speed particularly if the sensitivity is changeable. An exposure value EV3 determined by the auxiliary light assisted AE control for the AF and used in the AF control can be determined and used as an amount to detect an in-focus position precisely and effectively.

Figure 5:
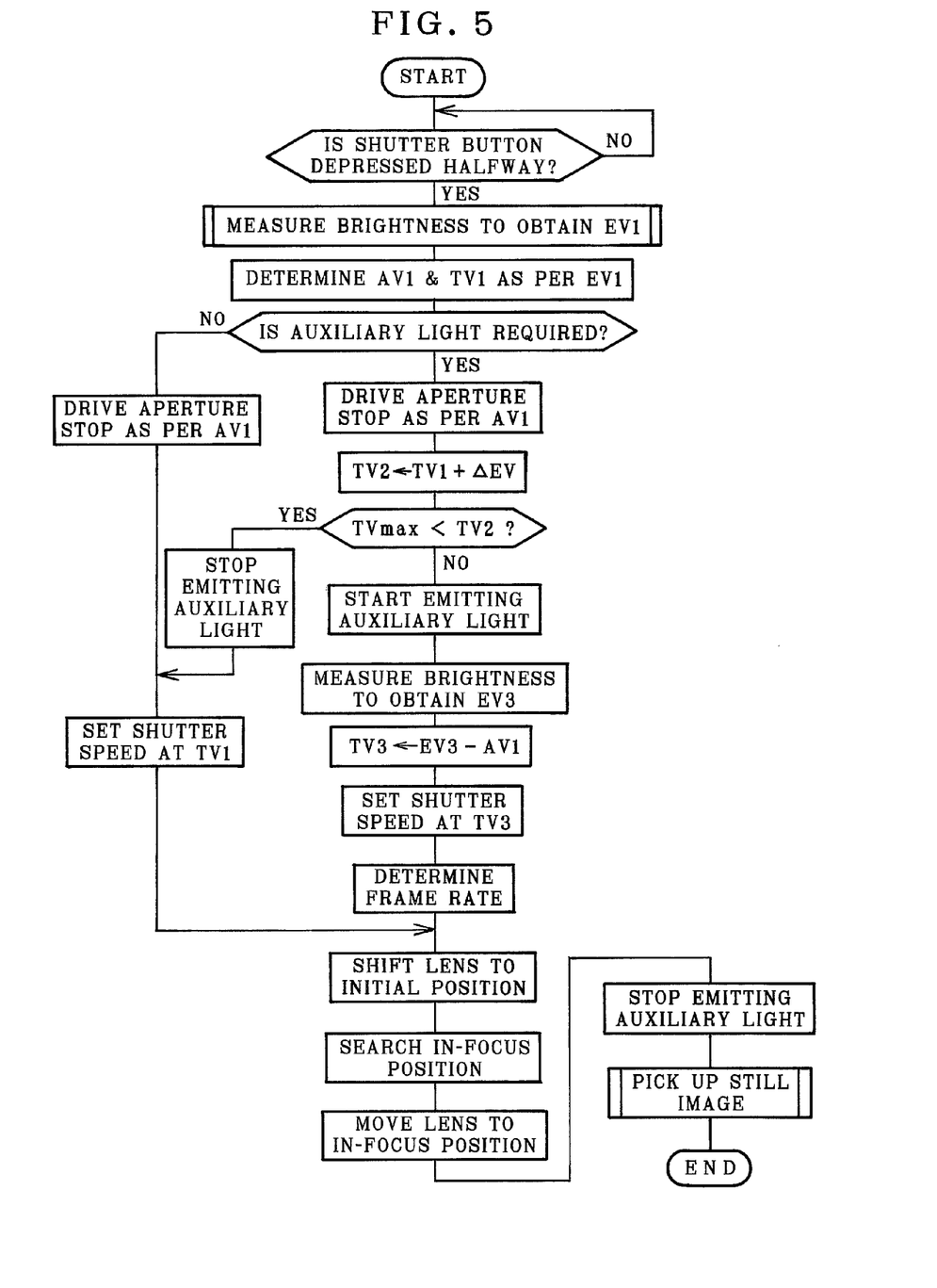
FIG. 5 is a flow chart illustrating a photographing sequence in response to operation of a shutter button.
Figure 6:
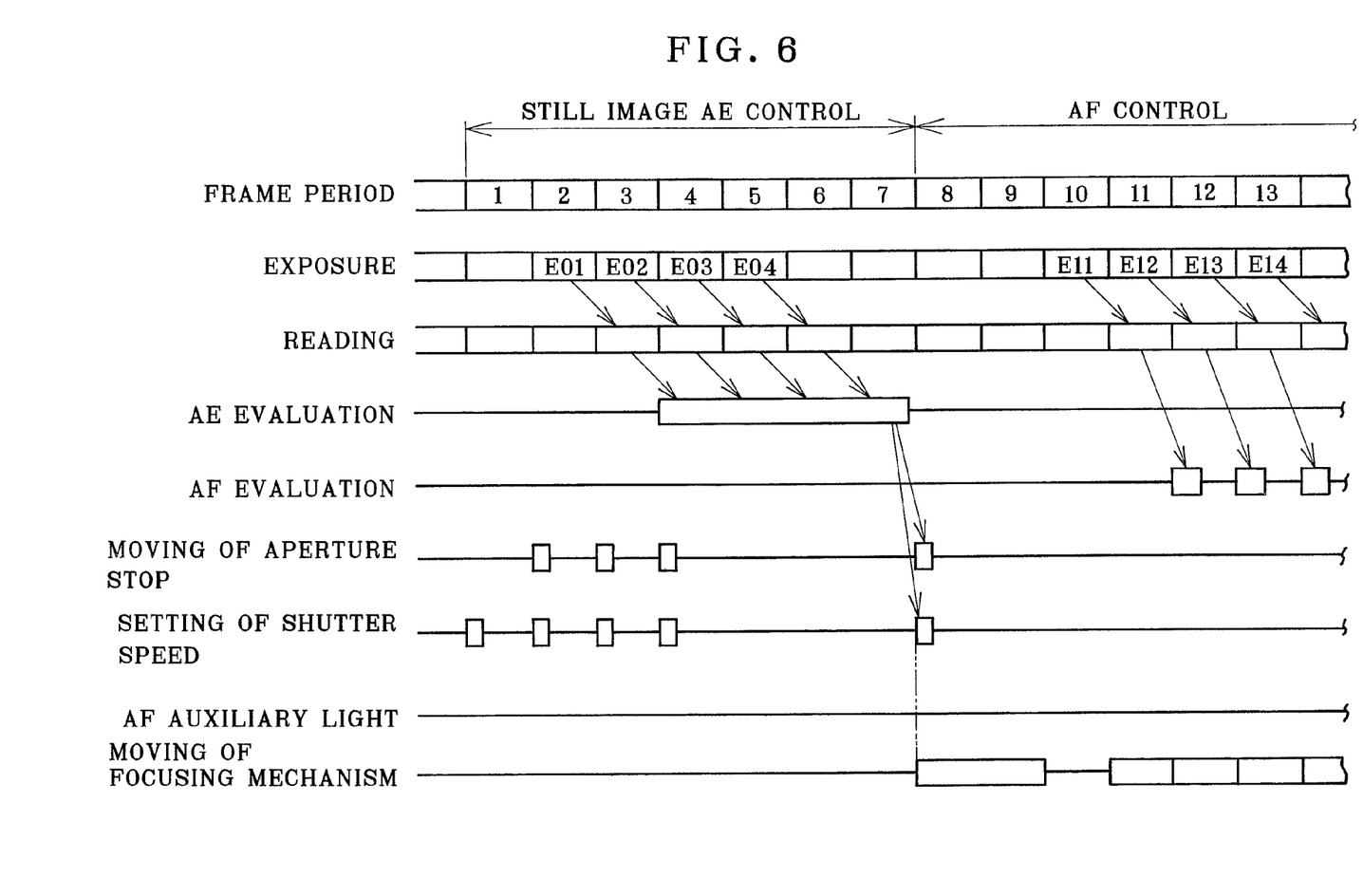
FIG. 6 is a timing chart illustrating AE and AF sequences in which no auxiliary light is emitted.
Figure 7:
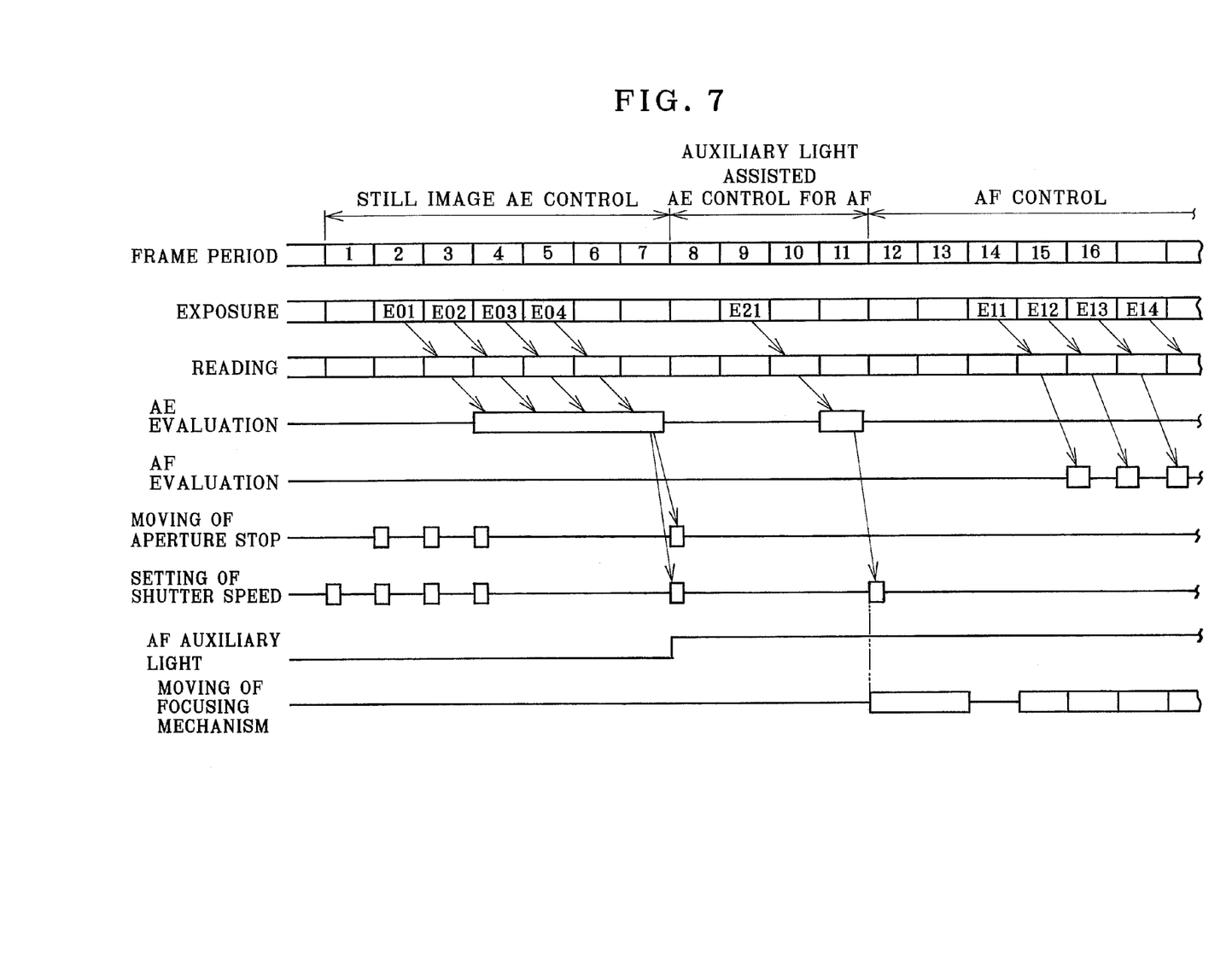
FIG. 7 is a timing chart illustrating AE and AF sequences in which AF auxiliary light is emitted.

The operation of the above construction is described next by referring to the flow in FIG. 5 and time sequences in FIGS. 6 and 7. FIG. 6 illustrates an example without use of AF auxiliary light. FIG. 7 illustrates an example in use of AF auxiliary light.

When the shutter release button 7 is depressed halfway, the still image AE control of a multi step sequence is started. A first frame period starts upon the halfway depression of the shutter release button 7. Parameters including the shutter speed in the first frame period are determined in the timing generator 16 by the system controller 10 for first photometry in the still image AE control.

In a second frame period, the aperture stop mechanism 14 is driven by the system controller 10 while an electronic shutter pulse is input from the start of the second frame period. An aperture stop value is set for first photometry. Then the input of the electronic shutter pulse discontinues, to carry out an exposure E01 with the image sensor 12. A shutter speed of the exposure E01 is according to the parameters set in the timing generator 16 during the first frame period.

At the end of the exposure E01, a third frame period starts. Transfer of charge stored in the image sensor 12 is started to output an image signal. The image signal is converted into the image data by means of the analog signal processor 17 and the A/D converter 18. The image data is sent by the image input controller 19 to the AE evaluator 25.

In the second frame period associated with the exposure E01, parameters are set in the timing generator 16 inclusive of a shutter speed for second photometry in which an exposure value is smaller than that of first photometry. In a third frame period, the aperture stop mechanism 14 is set at an aperture stop value for the second photometry. Object light is received by the image sensor 12 in an exposure E02. In a fourth frame period, an image signal is output according to the exposure E02, of which image data is sent to the AE evaluator 25.

Similarly, a shutter speed for the third photometry is determined in the third frame period in which the exposure E02 is carried out. The aperture stop mechanism 14 is set at an aperture stop value for the third photometry in the fourth frame period, before the exposure E03 is carried out. In a fifth frame period, image data of the exposure E03 is sent to the AE evaluator 25.

In third photometry at the exposure E03, the aperture stop value is set the smallest, so that the exposure is subject to influence of smear. Thus, smear detection is carried out after the third photometry without changing the aperture stop. In a fourth frame period, detection data are set in the timing generator 16 for detecting a smear component. In a fifth frame period, object light is received in an exposure E04. In the exposure E04, electric charge is stored at the shutter speed equal to that of the exposure E03. The stored charge is transferred in the vertical and horizontal transfer channels in a sixth frame period without transferring the stored charge in the vertical transfer channel of the image sensor 12. Therefore, image data of the smear component without a component of an object image is retrieved in the AE evaluator 25.

Thus, the operation of inputting image data of the smear component is completed. In a seventh frame period, image data of the exposure E03 is corrected by eliminating the smear component by the AE evaluator 25 according to a portion of the image data for the smear component. The AE evaluator 25 obtains the object brightness of a detection region in a multi step sequence according to the corrected image data and the image data obtained by the first and second photometry. The object brightness is sent to the system controller 10.

When object brightness is input to the system controller 10, an exposure value EV1 for image pickup of a still image is obtained from the object brightness. A program line, which is previously determined, is referred to, to convert the exposure value EV1 into a combination of a shutter speed TV1 and aperture stop value AV1. Also, the system controller 10 judges requirement of emission of AF auxiliary light according to the object brightness.

If the object brightness is equal to or more than the reference brightness level, then it is determined that no AF auxiliary light is required. In FIG. 6, the AF control is started after the still image AE control. In the eighth frame period, the AF control starts. The aperture stop mechanism 14 is driven to set the aperture stop value AV1 determined in the still image AE control. Also, parameters including the shutter speed TV1 are set in the timing generator 16. In the eighth and ninth frame periods, the focusing mechanism 13 is driven and moved to an initial position for detection of an in-focus position.

In a tenth frame period at the end of moving to the initial position, a first exposure E11 is carried out to detect an in-focus position. In an eleventh frame period, a result of the exposure E11 is output as an image signal. In a twelfth frame period, a focus evaluation value of the exposure is acquired by the AF evaluator 24, and sent to the system controller 10.

In the eleventh frame period, the focusing mechanism 13 is driven and moved to next in-focus position while an electronic shutter pulse is input to the image sensor 12. Then a second exposure E12 is carried out. An image signal of the exposure E12 is output during a twelfth frame period. In a thirteenth frame period, a focus evaluation value is obtained by the AF evaluator 24 and sent to the system controller 10. Similarly, the in-focus position at which the focus evaluation value is maximized is detected by the multi step exposure while the focusing mechanism 13 is driven. The focusing mechanism 13 is driven and moved to the in-focus position being detected, before image pickup of a still image. The shutter release button 7 comes to stand by for the full depression.

When the shutter release button 7 is depressed fully in the standby, parameters are set in the timing generator 16 inclusive of a shutter speed TV1 determined in the still image AE control, in order to photograph a still image. An exposure for a still image is carried out with the aperture stop value AV1 and shutter speed TV1 and with the frame period according to the parameters. Image data is obtained by the exposure, is processed by the image processor 22, compressed by the compressor/decompressor 23, and sent to the media controller 26 which writes the same in the memory card 9.

If the object brightness is lower than the reference brightness level, the system controller 10 determines that AF auxiliary light is required. In FIG. 7, auxiliary light assisted AE control for the AF is started at the eighth frame period. The aperture stop mechanism 14 is driven and positioned for the aperture stop value AV1 determined by the still image AE control. For the purpose of compatibility with an increase in the object brightness upon applying AF auxiliary light, parameters are set in the timing generator 16 inclusive of the shutter speed TV2 determined by shifting up the shutter speed TV1 by a shift amount $\Delta EV$ after the still image AE control. The light source LED 33 is driven to start emitting AF auxiliary light.

If the shutter speed TV2 after correction with the shift amount $\Delta EV$ is higher than the limit shutter speed TVmax which is the highest according to the performance of the image sensor 12, then correction of the shutter speed is canceled, because light amount of ambient light is sufficient even without AF auxiliary light. The AF control without auxiliary light follows.

In a ninth frame period, the exposure E21 in the auxiliary light assisted AE control for the AF is carried out according to the above-described aperture stop value AV1 and the shutter speed TV2. In the tenth frame period, a result of the exposure E21 is output as an image signal. In an eleventh frame period, the AE evaluator 25 as brightness detector obtains object brightness from the image data of the exposure E21. Data of the object brightness is sent to the system controller 10. The system controller 10 obtains an exposure value EV3 which is optimized for object brightness in a detection region for the AF control during application of AF auxiliary light, and obtains a shutter speed TV3 from the aperture stop value AV1 and the exposure value EV3.

Consequently, the object brightness can be measured with high precision in a single measuring step, because the use of the AF auxiliary light is combined with the exposure value EV2 obtained by an increase of the exposure value EV1 by the shift amount $\Delta EV$. The object brightness can be detected more rapidly than a multi step sequence in which object light is detected at plural times with plural exposure values. Furthermore, errors in the measurement due to overexposure can be prevented.

When the AF control is started in the twelfth frame period, parameters including the shutter speed TV3 for the AF control are set in the timing generator 16. To this end, a highest frame rate is set among frame rates for driving the image sensor 12 at the shutter speed TV3. In the twelfth and thirteenth frame periods, the focusing mechanism 13 is driven and moved to the initial position for the detection of an in-focus position. In the sequence with and after the thirteenth frame period, the AF control without the AF auxiliary light is carried out. Object light is received while the focusing mechanism 13 is driven, to detect an in-focus position with the highest AF evaluation value. The lens system 4 is moved and set in the in-focus position. It is possible to detect an in-focus position in an acceptable condition, because object light is received on the image sensor 12 at the exposure value determined in the auxiliary light assisted AE control for the AF.

After turning off the light source LED 33, the digital still camera 2 is ready for image pickup of a still image. When the shutter release button 7 is depressed fully, parameters for the image pickup are set in the timing generator 16. An image is photographed with the aperture stop value AV1 and shutter speed TV1. There is no driving of the aperture stop mechanism 14, so reception of object light can start for a still image only with a small time lag. The image data is obtained, and then processed by image processing and data compression, and is written to the memory card 9.

Figure 8:
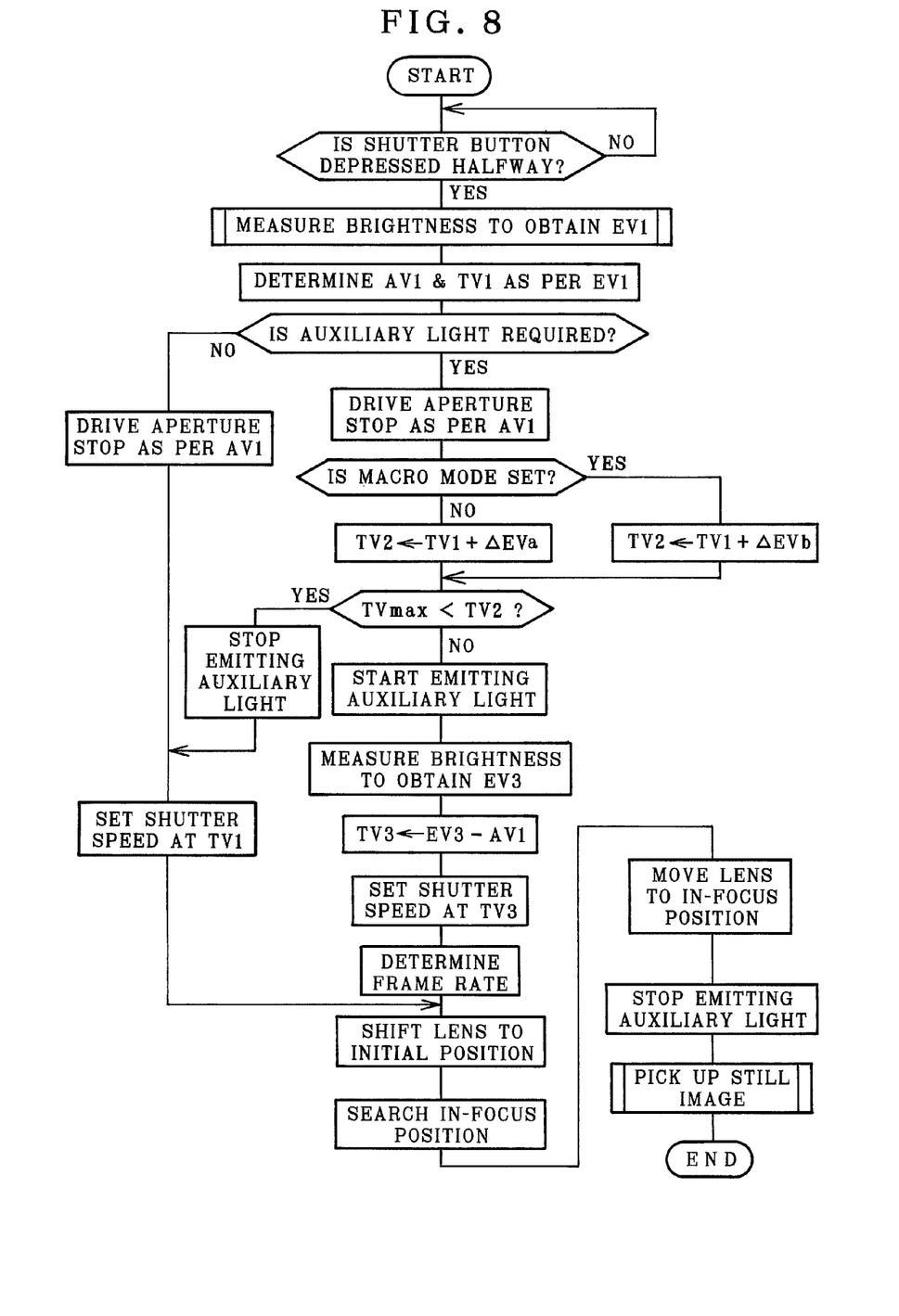
FIG. 8 is a flow chart illustrating a preferred embodiment in which a macro photographing mode can be selected.

In FIG. 8, another preferred embodiment is illustrated, in which a macro photographing mode is selectable, and a shift amount of an exposure value is different between the macro and normal photographing modes. Elements similar to those of the above embodiment are designated with identical reference numerals.

The button panel 11 in the digital still camera 2 is a selector for setting a selected one of a normal photographing mode and a macro photographing mode. In the normal photographing mode, the digital still camera 2 is set suitably for an object in an object distance range from several meters to infinity. In the macro photographing mode, the digital still camera 2 is set suitably for an object in an object distance range of tens of centimeters.

In FIG. 8, the exposure value is shifted toward the positive side by use of a shift amount $\Delta EVa$ in the auxiliary light assisted AE control for the AF in the normal photographing mode, the shift amount being determined for a shift according to an increase in the brightness for an object with a normally expected object distance and expected effect of auxiliary light. In the auxiliary light assisted AE control for the AF in the macro photographing mode, the object distance is small (near). It is expected that an increase in the brightness is greater in applying AF auxiliary light than in the normal photographing mode. Thus, a shift amount ΔEVb higher than the shift amount ΔEVa is used to shift the exposure value toward the positive side. It is possible to determine a shift amount ΔEVb according to a light amount of auxiliary light and a normally expected object distance in the macro photographing mode. Also, it is preferable to determine a shift amount ΔEV in such a manner that an object of a shortest object distance in any of the normal and macro photographing modes, upon reception of auxiliary light, has brightness in a measurable brightness range.

Note that, in place of the above macro and normal photographing modes, selectable modes in the digital still camera 2 may be any modes in which the object distance is different, for example, the normal photographing mode and a far distance photographing mode.

Figure 9:
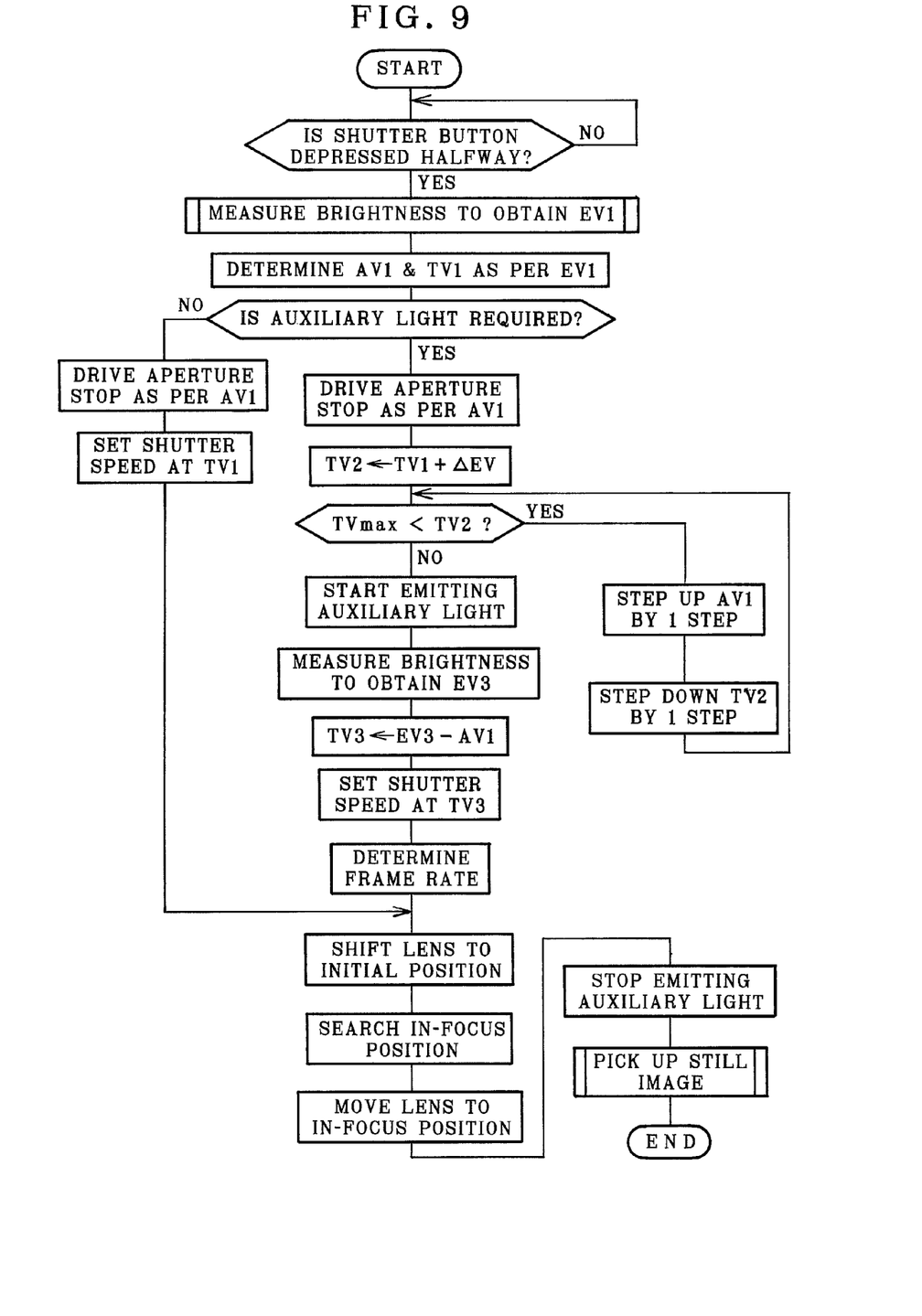
FIG. 9 is a flow chart illustrating a preferred embodiment in which driving of an aperture stop mechanism is allowed in an auxiliary light assisted AE control for the AF.

In FIG. 9, still another preferred embodiment is illustrated. If the shutter speed TV2 is higher (faster) than the limit shutter speed TVmax of the image sensor 12 after correcting the shutter speed with the shift amount ΔEV, the aperture stop mechanism 14 is stopped down, to set the shutter speed TV2 equal to or lower (slower) than the shutter speed TVmax so as to carry out the auxiliary light assisted AE control for the AF and the AF control. Time for driving the aperture stop mechanism 14 is longer. However, it is possible precisely to effect the AF control in a well conditioned manner with AF auxiliary light. It is to be noted that a shutter speed range may be predetermined for the operability of the shutter. If the shutter speed TV2 is outside the reference shutter speed range of the image sensor 12 after correcting the shutter speed with the shift amount, the aperture stop mechanism 14 is driven and changed to set the shutter speed TV2 within the reference shutter speed range. Furthermore, sensitivity of the image sensor 12 may be changed in place of the aperture stop value.

In the above embodiment, an apparatus for photographing is a digital still camera. However, an apparatus for photographing in the invention can be any optical apparatus in which an in-focus position and object brightness are detected according to an image signal from an image sensor.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image pickup apparatus having an image sensor for picking up an object through a lens system to output an image signal, comprising:
    an illumination light source for applying auxiliary light to said object;
    an autofocus evaluator for autofocus control of setting said lens system in an in-focus position according to said image signal while said auxiliary light is applied;
    a brightness detector for carrying out first brightness detection of first object brightness according to an image signal from said image sensor without said auxiliary light, and for carrying out second brightness detection of second object brightness according to said image signal while said auxiliary light is applied;
    an exposure determiner for determining a first exposure value from said first object brightness, determining a second exposure value from said first exposure value, and determining a third exposure value from said second object brightness; and
    an exposure controller for controlling exposure of said image sensor in said first and second brightness detection, said autofocus control and still image pickup, wherein said exposure, in said second brightness detection, is controlled according to said second exposure value, and in said autofocus control, is controlled according to said third exposure value.

2. An exposure control method, comprising steps of:
    carrying out first brightness detection of first object brightness according to an image signal from an image sensor without auxiliary light;
    determining a first exposure value from said first object brightness;
    determining a second exposure value from said first exposure value;
    carrying out second brightness detection of second object brightness according to an image signal output by said image sensor while said auxiliary light is emitted to illuminate, wherein in said second brightness detection, exposure of said image sensor is controlled according to said second exposure value;
    determining a third exposure value from said second object brightness; and
    carrying out autofocus control of setting a lens system in an in-focus position according to said image signal while said auxiliary light is emitted to illuminate, wherein in said autofocus control, exposure of said image sensor is controlled according to said third exposure value.

3. An image pickup apparatus as defined in claim 1, wherein said first brightness detection is carried out when or before a release button is depressed halfway, and said second brightness detection and said autofocus control are carried out after said first brightness, and said still image pickup is carried out when said release button is depressed deeply.

4. An image pickup apparatus as defined in claim 3, wherein said exposure controller controls exposure of said image sensor according to said first exposure value for said still image pickup.

5. An image pickup apparatus as defined in claim 4, wherein said brightness detector splits said image sensor into plural regions, and detects said first and second object brightness from said regions, and said first object brightness is detected in plural times of measuring in each of which said exposure controller changes an exposure value in a stepwise manner, so as to measure said regions in plural brightness levels.

6. An image pickup apparatus as defined in claim 1, wherein if said first object brightness is equal to or more than a reference brightness level, said brightness detector is inactive and without said second brightness detection;
    said illumination light source is inactive without emitting said auxiliary light for said autofocus control after said first brightness detection, and said exposure controller controls exposure of said image sensor according to said first exposure value.

7. An image pickup apparatus as defined in claim 1, wherein said second exposure value is determined by shifting said first exposure value positively by a predetermined shift amount.

8. An image pickup apparatus as defined in claim 7, wherein said shift amount is predetermined according to a light amount of said auxiliary light.

9. An image pickup apparatus as defined in claim 7, wherein said shift amount is so determined that brightness of said object of a predetermined shortest object distance is within a measurable range by use of said auxiliary light.

10. An image pickup apparatus as defined in claim 7, wherein said image sensor operates with an electronic shutter function for controlling time of storing charge according to a shutter speed;

wherein said exposure controller includes an aperture stop mechanism for adjusting an amount of light incident upon said image sensor, and adjusts an aperture stop value and said shutter speed according to an exposure value.

11. An image pickup apparatus as defined in claim 10, wherein said exposure controller determines a first aperture stop value and a first shutter speed according to said first exposure value, and sets a second shutter speed shifted by said shift amount toward a high speed side according to said second exposure value.

12. An image pickup apparatus as defined in claim 11, wherein said exposure controller sets said first aperture stop value and said second shutter speed for said second brightness detection, and sets said first aperture stop value and a third shutter speed for said autofocus control, and said third shutter speed is a shutter speed to obtain said third exposure value in a condition of said first aperture stop value.

13. An image pickup apparatus as defined in claim 12, wherein said exposure controller sets said first aperture stop value and said first shutter speed for said still image pickup.

14. An image pickup apparatus as defined in claim 12, further comprising a frame rate setter for setting a frame rate of said image sensor, and for determining said frame rate highest in a range where said image sensor is operable with said third shutter speed.

15. An image pickup apparatus as defined in claim 11, wherein if said second shutter speed is equal to or higher than a predetermined shutter speed, said brightness detector is inactive and without said second brightness detection;

said illumination light source is inactive without emitting said auxiliary light for said autofocus control after said first brightness detection, and said exposure controller sets said first shutter speed and said first aperture stop value.

16. An image pickup apparatus as defined in claim 11, wherein when said second shutter speed is faster than said predetermined shutter speed, said exposure controller changes said aperture stop value to set a shutter speed upon said second brightness detection is set within said predetermined shutter speed.

17. An image pickup apparatus as defined in claim 1, further comprising a mode selector for setting a selected one of a normal photographing mode for photography at a normal object distance and a macro photographing mode for photography of an object in enlargement at an object distance shorter than said normal object distance;

wherein said exposure determiner, if said normal photographing mode is set, determines said second exposure value by shifting said first exposure value positively by a shift amount predetermined according to a light amount of said auxiliary light, and if said macro photographing mode is set, determines said second exposure value by shifting said first exposure value positively by a larger shift amount than said predetermined shift amount.

18. An exposure control method as defined in claim 17, wherein said second exposure value is determined by shifting said first exposure value positively by a predetermined shift amount according to a light amount of said auxiliary light.

19. An exposure control method as defined in claim 18, further comprising a step of picking up a still image with said image sensor after said autofocus control, wherein exposure of said image sensor is controlled in still image pickup according to said first exposure value.

20. The apparatus of claim 1, wherein the first object brightness comprises the brightness of still image auto exposure control according to an image signal from said image sensor without said auxiliary light, the second object brightness comprises the brightness of auxiliary light assisted auto exposure control for said autofocus control according to said image signal while said auxiliary light is applied;

and the first exposure value determined from said first object brightness in said still image auto exposure control, the second exposure value used in said auxiliary light assisted auto exposure control for said autofocus control is determined from said first exposure value, and the third exposure value used in said autofocus control is determined from said second object brightness.

* * * * *